(12) United States Patent
Hostettler et al.

(10) Patent No.: US 12,693,873 B2
(45) Date of Patent: Jul. 28, 2026

(54) SYSTEMS AND METHODS FOR GENERATING DATA LINEAGE

(71) Applicant: Wolters Kluwer Financial Services Belgium N.V., Mechelen (BE)

(72) Inventors: Steve Patrick Hostettler, Saint-Prex (CH); Patrick Catillaz, Bex (CH); Laurent Vanzeune, Strombeek-Bever (BE); Benjamin Garaude, Lausanne (CH)

(73) Assignee: Regnology FRR Belgium, Ghent (BE)

( * ) Notice: Subject to any disclaimer, the term of this patent is extended or adjusted under 35 U.S.C. 154(b) by 353 days.

(21) Appl. No.: 18/480,083

(22) Filed: Oct. 3, 2023

(65) Prior Publication Data

US 2025/0110752 A1      Apr. 3, 2025

(51) Int. Cl.
     G06F 9/445      (2018.01)
     G06F 9/38       (2018.01)
(52) U.S. Cl.
     CPC ........ G06F 9/44589 (2013.01); G06F 9/3836 (2013.01)
(58) Field of Classification Search
     CPC ........................... G06F 9/44589; G06F 9/3826
     USPC .................................................. 717/124–141
     See application file for complete search history.

(56) References Cited

U.S. PATENT DOCUMENTS 6,418,444 B1 * 7/2002 Raduchel ............ G06F 9/44589
                                                            713/153
8,775,875 B2 * 7/2014 Isherwood .......... G06F 11/3476
                                                            714/45

9,582,495 B2 * 2/2017 Song ........................ G06F 40/30
9,720,695 B2 * 8/2017 Isherwood ............ G06F 11/348
9,990,428 B2 * 6/2018 Anand ................. G06F 16/9538
10,275,242 B2 * 4/2019 Nguyen ............. G06F 9/30003
11,798,542 B1 * 10/2023 Ryabov ................. G10L 15/197
12,314,744 B1 * 5/2025 Cichy ...................... G06F 9/453

(Continued)

OTHER PUBLICATIONS

Marek et al, "DiSL: A Domain-Specific Language for Bytecode Instrumentation", ACM, pp (Year: 2012).*

(Continued)

*Primary Examiner* — Anil Khatri
(74) *Attorney, Agent, or Firm* — Morgan, Lewis & Bockius LLP

(57)                      ABSTRACT

Systems and methods for lineage data tracking are disclosed. Domain-specific code is obtained in response to a build request and the domain-specific code is converted to process code. The domain-specific code includes an instance of a domain-specific language configured for a specific domain. The process code includes at least one breadcrumb instrumentation element automatically inserted during the conversion process by a conversion engine and the breadcrumb instrumentation element is not defined in the domain-specific code. The process code is executed including execution of one or more activities defined by the domain-specific code and the at least one breadcrumb instrumentation element. During execution of the at least one breadcrumb instrumentation element, a lineage data structure is generated. The lineage data structure is configured to store data elements representative of a mapping between an input data element and an output data element. The lineage data structure is stored in a data store.

17 Claims, 6 Drawing Sheets

(56) References Cited

U.S. PATENT DOCUMENTS

| 12,326,936 B2 * | 6/2025 | Zawadowskiy ......... G06F 21/51 |
| 12,530,433 B1 * | 1/2026 | Tabak ..................... G06F 18/22 |
| 2020/0285977 A1 * | 9/2020 | Brebner ................... G06F 8/76 |
| 2023/0418878 A1 * | 12/2023 | Wonus ................ G06F 16/9024 |

OTHER PUBLICATIONS

Silva, "Towards a Domain-Specific Language to Specify Interaction Scenarios forWeb-Based Graphical User Interfaces", ACM, pp. 1-6 (Year: 2022).*
Yu et al, "Enhancing Domain-Specific Code Completion via Collaborative Inference with Large and Small Language Models", ACM, pp. 1-27 (Year: 2025).*
Chiba et al, "Deeply Reifying Running Code for Constructing a Domain-Specific Language", ACM, pp. 1-13 (Year: 2016).*
Sierra et al, "Document-Oriented Software Construction based on Domain-Specific Markup Languages", IEEE, pp. 1-6 (Year: 2005).*
International Search Report issued in corresponding Application No. PCT/IB2024/059694, dated Feb. 18, 2025, 3 pages.
Schoenenwald, et al., "Collecting and visualizing data lineage of Spark jobs", Datenbank-Spektrum, Dpunkt Verlag, Heidelberg, DE. vol. 21, No. 3, pp. 179-189 (2021).
Michael D. Bond, et al., "Breadcrumbs", Proceedings of the 2010 ACM Sigplan conference on programming language design and implementation. Jun. 5-10, 2010, Toronto, Ontario, Canada, ACM, New York, NY, USA.

* cited by examiner

250

SYSTEMS AND METHODS FOR GENERATING DATA LINEAGE

TECHNICAL FIELD

This application relates generally to data lineage, and more particularly, to automatic generation, collection, storage, and/or querying of data lineage.

BACKGROUND

When executing programs and processes that are related to or governed by regulatory or compliance frameworks, it may be necessary to document processes uses to produce a particular output. Current third-party programs or processes do not provide adequate insights into the operations of the underlying processes sufficient to satisfy compliance requirements. For example, third-party programs may be provided solely in object code with only initial inputs and final outputs visible to a user and no information available regarding the internal workings of the program (e.g., a "black box" solution).

SUMMARY

In various embodiment, a system is disclosed. The system includes a non-transitory memory and a processor communicatively coupled to the non-transitory memory. The processor is configured to read a set of instructions to obtain domain-specific code in response to a build request and convert the domain-specific code to process code. The domain-specific code includes an instance of a domain-specific programming language configured for a specific domain. The process code includes at least one breadcrumb instrumentation element automatically inserted during the conversion process by a conversion engine. The breadcrumb instrumentation element is not defined in the domain-specific code. The processor is further configured to execute the process code including execution of one or more activities defined by the domain-specific code and the at least one breadcrumb instrumentation element. During execution of the at least one breadcrumb instrumentation element, a lineage data structure is generated. The lineage data structure is configured to store data element representative of a mapping between an input data element and an output data element. The processor is further configured to store the lineage data structure in a data store.

In various embodiments, a computer-implemented method is disclosed. The computer-implemented method includes a step of converting domain-specific code to process code. The domain-specific code includes an instance of a domain-specific programming language configured for a specific domain. The process code includes at least one breadcrumb instrumentation element automatically inserted during the conversion process by a conversion engine. The breadcrumb instrumentation element is not defined in the domain-specific code. The computer-implemented method further includes a step of executing the process code. Execution of the process code includes execution of one or more activities defined by the domain-specific code and the at least one breadcrumb instrumentation element. During execution of the at least one breadcrumb instrumentation element, a lineage data structure is generated. The lineage data structure is configured to store data element representative of a mapping between an input data element and an output data element. The computer-implemented method further includes a step of storing the lineage data structure in a data store.

In various embodiments, a non-transitory computer readable medium having instructions stored thereon is disclosed. The instructions, when executed by at least one processor, cause at least one device to perform operations including obtaining domain-specific code in response to a build request and converting domain-specific code to process code. The domain-specific code includes an instance of a domain-specific programming language configured for a specific domain. The process code includes at least one breadcrumb instrumentation element automatically inserted during the conversion process by a conversion engine and the breadcrumb instrumentation element is not defined in the domain-specific code. The at least one breadcrumb instrumentation element is inserted in the process code at a location corresponding to a function type defined in the domain-specific code. The device further performs operations including executing the process code including execution of one or more activities defined by the domain-specific code and the at least one breadcrumb instrumentation element. During execution of the at least one breadcrumb instrumentation element, a lineage data structure is generated. The lineage data structure is configured to store data elements representative of a mapping between an input data element and an output data element. The device further performs operations including storing the lineage data structure in a data store.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
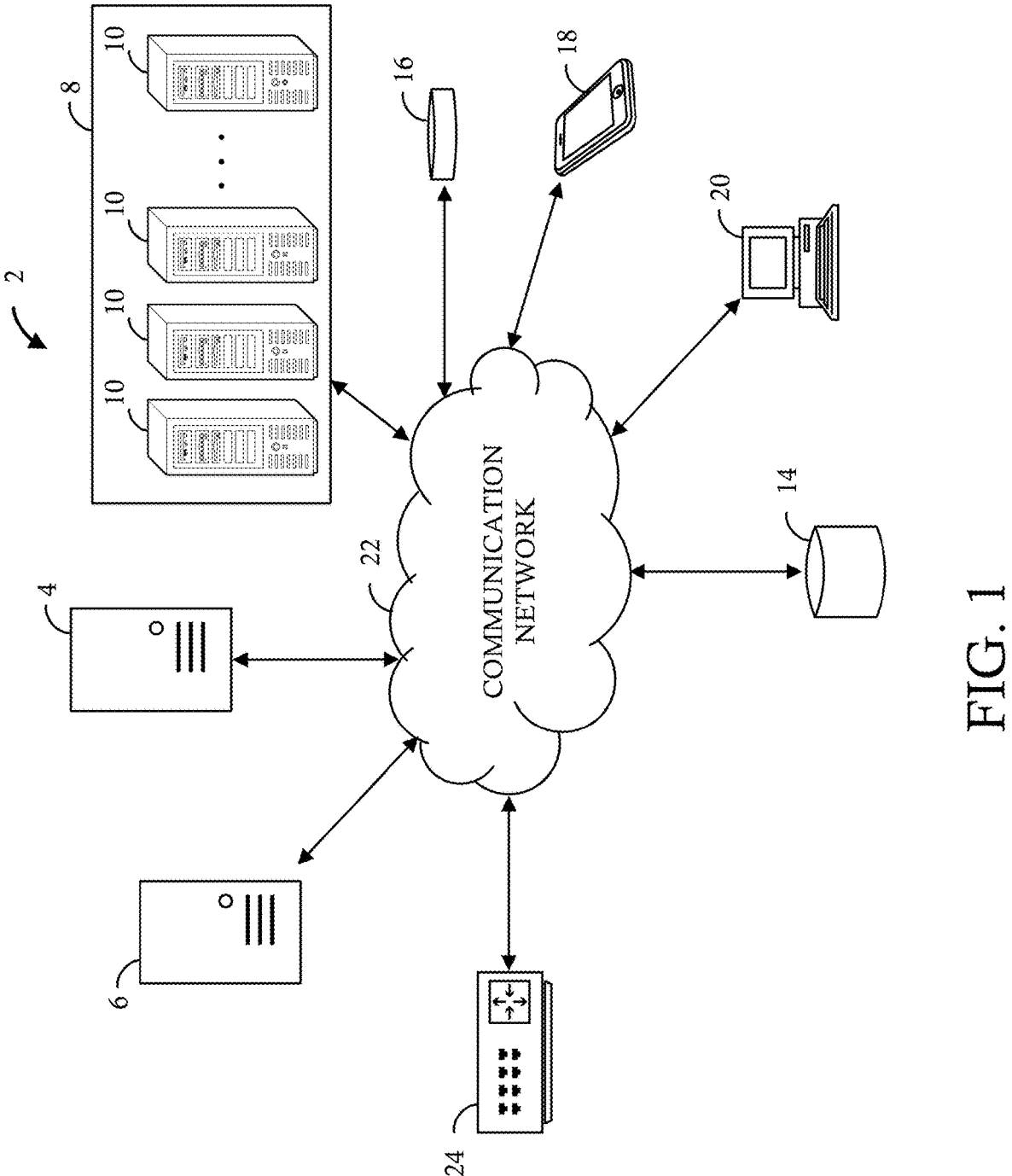
FIG. 1 illustrates a network environment configured to provide automated data lineage tracking, in accordance with some embodiments.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically connected (e.g., wired, wireless, etc.) to one another either directly or indirectly through intervening systems, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages, or alternative embodiments herein may be assigned to the other claimed objects and vice versa. In other words, claims for the systems may be improved with features described or claimed in the context of the methods. In this case, the functional features of the method are embodied by objective units of the systems. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

Furthermore, in the following, various embodiments are described with respect to methods and systems for data lineage tracking. In various embodiments, a data lineage tracking system is configured to generate data elements representative of mappings between one or more inputs to a selected process and one or more outputs of the process, referred to herein as "breadcrumbs." In some embodiments, breadcrumbs are generated for each activity, or sub-activity, which occurs during execution of a process or workflow. For example, and as discussed in greater detail below, a first process may receive a data structure A including a first set of data elements (e.g., a first input data set) and generate a second data structure B including a second set of data elements (e.g., a first output data set). The data structure B may be subsequently provided to a second process (e.g., data structure B is a second input data set) that generates a data structure C including a third set of data elements (e.g., a second output data set). A breadcrumb may be generated for each of the first, second, and third processes detailing the input dataset and the output dataset for the specific iteration of the associated process.

In some embodiments, the data lineage tracking system is configured to convert domain-specific code into process code including lineage tracking elements, such as breadcrumb instrumentation elements, generate breadcrumb data elements, and/or provide review of breadcrumb data elements. The data lineage tracking system includes a code conversion engine configured to receive domain-specific code, translate the domain-specific code to process code, and insert lineage tracking elements at selected locations corresponding to one or more activities within the process code. The process code is executed by a process execution engine configured to execute both generic programming elements generated from the domain-specific code and breadcrumb instrumentation elements inserted by the code conversion engine. The process execution engine generates lineage data structures including breadcrumb data elements corresponding to the one or more activities within the process code. A lineage interface is configured to display interface elements incorporating and/or interpreting breadcrumb data elements. In some embodiments, the process execution engine is configured to retrieve and interpret breadcrumb data elements for inclusion within the lineage interface.

FIG. 1 illustrates a network environment 2 configured to provide data lineage tracking, in accordance with some embodiments. The network environment 2 includes a plurality of devices or systems configured to communicate over one or more network channels, illustrated as a network cloud 22. For example, in various embodiments, the network environment 2 may include, but is not limited to, a process execution computing device 4, a web server 6, a cloud-based engine 8 including one or more processing devices 10, a data store 14, and/or one or more user computing devices 16, 18, 20 operatively coupled over the network 22. The process execution computing device 4, the web server 6, the processing device(s) 10, the workstation(s) 12, and/or the user computing devices 16, 18, 20 may each be a suitable computing device that includes any hardware or hardware and software combination for processing and handling information. For example, each computing device may include, but is not limited to, one or more processors, one or more field-programmable gate arrays (FPGAs), one or more application-specific integrated circuits (ASICs), one or more state machines, digital circuitry, and/or any other suitable circuitry. In addition, each computing device may transmit and receive data over the communication network 22.

In some embodiments, each of the process execution computing device 4 and the processing device(s) 10 may be a computer, a workstation, a laptop, a server such as a cloud-based server, or any other suitable device. In some embodiments, each of the processing devices 10 is a server that includes one or more processing units, such as one or more graphical processing units (GPUs), one or more central processing units (CPUs), and/or one or more processing cores. Each processing device 10 may, in some embodiments, execute one or more virtual machines. In some embodiments, processing resources (e.g., capabilities) of the one or more processing devices 10 are offered as a cloud-based service (e.g., cloud computing). For example, the cloud-based engine 8 may offer computing and storage resources of the one or more processing devices 10 to the process execution computing device 4.

In some embodiments, each of the user computing devices 16, 18, 20 may be a cellular phone, a smart phone, a tablet, a personal assistant device, a voice assistant device, a digital assistant, a laptop, a computer, or any other suitable device. In some embodiments, the web server 6 hosts one or more network environments, such as a distributed process execution environment. In some embodiments, the process execution computing device 4, the processing devices 10, and/or the web server 6 are operated by the network environment provider, and the user computing devices 16, 18, 20 are operated by users of the network environment. In some embodiments, the processing devices 10 are operated by a third party (e.g., a cloud-computing provider).

Although FIG. 1 illustrates three user computing devices 16, 18, 20, the network environment 2 may include any number of user computing devices 16, 18, 20. Similarly, the network environment 2 may include any number of the process execution computing device 4, the web server 6, the processing devices 10, and/or the data stores 14. It will further be appreciated that additional systems, servers, storage mechanism, etc. may be included within the network environment 2. In addition, although embodiments are illustrated herein having individual, discrete systems, it will be appreciated that, in some embodiments, one or more systems may be combined into a single logical and/or physical system. For example, in various embodiments, one or more of the process execution computing device 4, the web server 6, the data store 14, the user computing devices 16, 18, 20, and/or the router 24 may be combined into a single logical and/or physical system. Similarly, although embodiments are illustrated having a single instance of each device or system, it will be appreciated that additional instances of a device may be implemented within the network environment 2. In some embodiments, two or more systems may be operated on shared hardware in which each system operates as a separate, discrete system utilizing the shared hardware, for example, according to one or more virtualization schemes.

The communication network 22 may be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 22 may provide access to, for example, the Internet.

Each of the first user computing device 16, the second user computing device 18, and the Nth user computing device 20 may communicate with the web server 6 over the communication network 22. For example, each of the user computing devices 16, 18, 20 may be operable to view, access, and interact with a web environment, such as a distributed process execution environment, hosted by and/or accessible via the web server 6.

In some embodiments, the web server 6 transmits a build request and/or code for execution to the process execution computing device 4. The build request may include a request to execute domain-specific code. The domain-specific code may be converted by the process execution computing device 4 into one or more other computer languages, such as one or more generic computer languages. During execution, the process execution computing device 4 may automatically insert breadcrumb instrumentation elements at appropriate locations within the converted code. For example, in some embodiments, the process execution computing device 4 may automatically insert breadcrumb instrumentation elements at positions corresponding to each activity defined by the domain-specific code.

The process execution computing device 4 is further operable to communicate with the data store 14 over the communication network 22. For example, the process execution computing device 4 may store data to, and read data from, the data store 14. The data store 14 may be a remote storage device, such as a cloud-based server, a disk (e.g., a hard disk), a memory device on another application server, a networked computer, or any other suitable remote storage. Although shown remote to the process execution computing device 4, in some embodiments, the data store 14 may be a local storage device, such as a hard drive, a non-volatile memory, or a USB stick.

Figure 2:
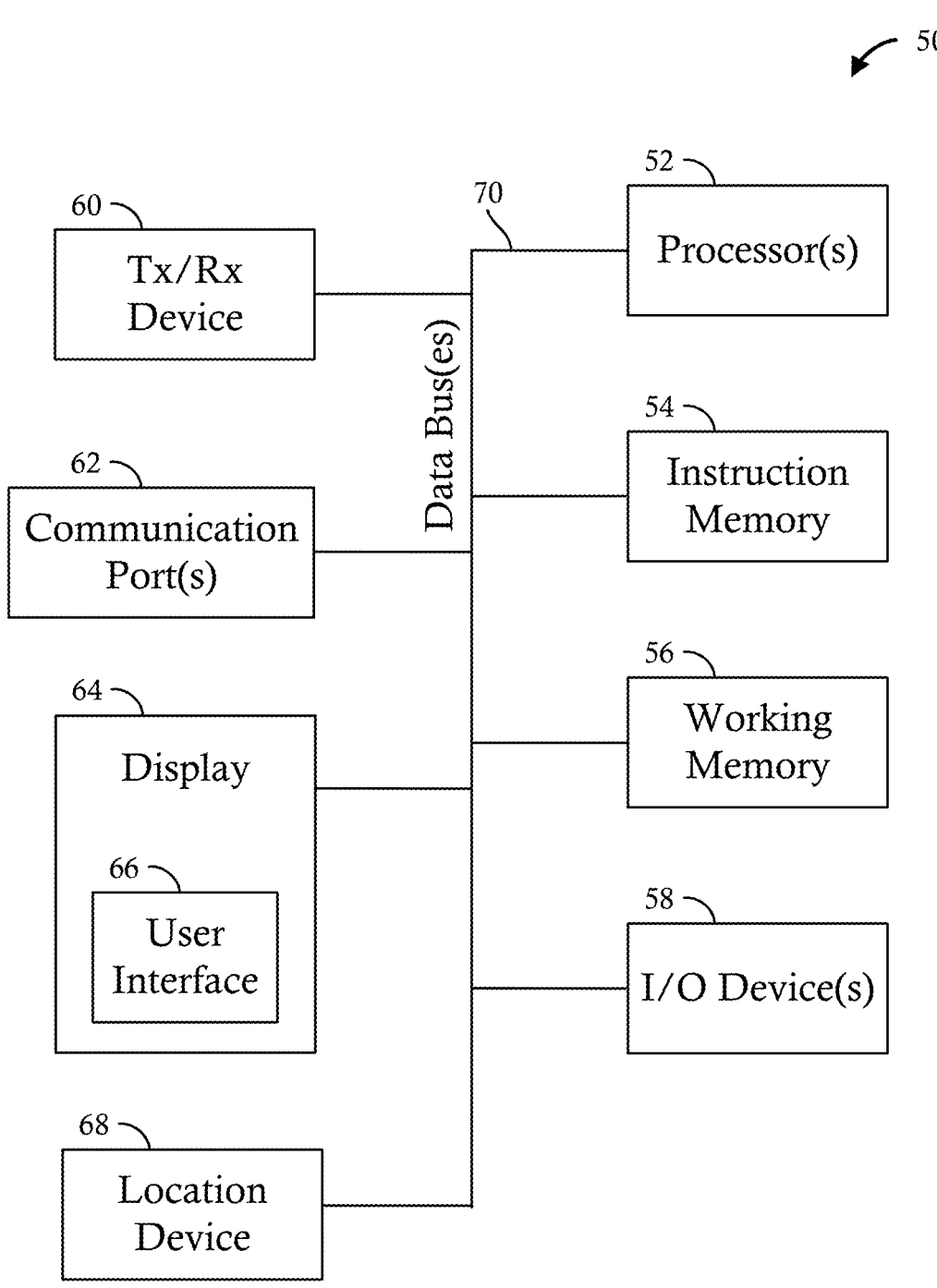
FIG. 2 illustrates a computer system configured to implement one or more processes, in accordance with some embodiments.

FIG. 2 illustrates a block diagram of a computing device 50, in accordance with some embodiments. In some embodiments, each of the process execution computing device 4, the web server 6, the one or more processing devices 10, and/or the user computing devices 16, 18, 20 in FIG. 1 may include the features shown in FIG. 2. Although FIG. 2 is described with respect to certain components shown therein, it will be appreciated that the elements of the computing device 50 may be combined, omitted, and/or replicated. In addition, it will be appreciated that additional elements other than those illustrated in FIG. 2 may be added to the computing device.

As shown in FIG. 2, the computing device 50 may include one or more processors 52, an instruction memory 54, a working memory 56, one or more input/output devices 58, a transceiver 60, one or more communication ports 62, a display 64 with a user interface 66, and an optional location device 68, all operatively coupled to one or more data buses 70. The data buses 70 allow for communication among the various components. The data buses 70 may include wired, or wireless, communication channels.

The one or more processors 52 may include any processing circuitry operable to control operations of the computing device 50. In some embodiments, the one or more processors 52 include one or more distinct processors, each having one or more cores (e.g., processing circuits). Each of the distinct processors may have the same or different structure. The one or more processors 52 may include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 52 may also be implemented by a controller, a microcontroller, an application specific integrated circuit (ASIC), a field programmable gate array (FPGA), a programmable logic device (PLD), etc.

In some embodiments, the one or more processors 52 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 54 may store instructions that are accessed (e.g., read) and executed by at least one of the one or more processors 52. For example, the instruction memory 54 may be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 52 may be configured to perform a certain function or operation by executing code, stored on the instruction memory 54, embodying the function or operation. For example, the one or more processors 52 may be configured to execute code stored in the instruction memory 54 to perform one or more of any function, method, or operation disclosed herein.

Additionally, the one or more processors 52 may store data to, and read data from, the working memory 56. For example, the one or more processors 52 may store a working set of instructions to the working memory 56, such as instructions loaded from the instruction memory 54. The one or more processors 52 may also use the working memory 56 to store dynamic data created during one or more operations. The working memory 56 may include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 54 and working memory 56, it will be appreciated that the computing device 50 may include a single memory unit configured to operate as both instruction memory and working memory. Further, although embodiments are discussed herein including non-volatile memory, it will be appreciated that computing device 50 may include volatile memory components in addition to at least one non-volatile memory component.

In some embodiments, the instruction memory 54 and/or the working memory 56 includes an instruction set, in the form of a file for executing various methods, such as methods for data lineage tracking, as described herein. The instruction set may be stored in any acceptable form of machine-readable instructions, including source code or various appropriate programming languages. Some examples of programming languages that may be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 52.

The input-output devices 58 may include any suitable device that allows for data input or output. For example, the input-output devices 58 may include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 60 and/or the communication port(s) 62 allow for communication with a network, such as the communication network 22 of FIG. 1. For example, if the communication network 22 of FIG. 1 is a cellular network, the transceiver 60 is configured to allow communications with the cellular network. In some embodiments, the transceiver 60 is selected based on the type of the communication network 22 the computing device 50 will be operating in. The one or more processors 52 are operable to receive data from, or send data to, a network, such as the communication network 22 of FIG. 1, via the transceiver 60.

The communication port(s) 62 may include any suitable hardware, software, and/or combination of hardware and software that is capable of coupling the computing device 50 to one or more networks and/or additional devices. The communication port(s) 62 may be arranged to operate with any suitable technique for controlling information signals using a desired set of communications protocols, services, or operating procedures. The communication port(s) 62 may include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 62 allows for the programming of executable instructions in the instruction memory 54. In some embodiments, the communication port(s) 62 allow for the transfer (e.g., uploading or downloading) of data, such as machine learning model training data.

In some embodiments, the communication port(s) 62 are configured to couple the computing device 50 to a network.

The network may include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments may include in-body communications, various devices, and various modes of communications such as wireless communications, wired communications, and combinations of the same.

In some embodiments, the transceiver 60 and/or the communication port(s) 62 are configured to utilize one or more communication protocols. Examples of wired protocols may include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols may include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 64 may be any suitable display, and may display the user interface 66. The user interfaces 66 may enable user interaction with data lineage data structures, such as breadcrumbs. For example, the user interface 66 may be a user interface for an application of a network environment operator that allows a user to view and interact with the operator's website. In some embodiments, a user may interact with the user interface 66 by engaging the input-output devices 58. In some embodiments, the display 64 may be a touchscreen, where the user interface 66 is displayed on the touchscreen.

The display 64 may include a screen such as, for example, a Liquid Crystal Display (LCD) screen, a light-emitting diode (LED) screen, an organic LED (OLED) screen, a movable display, a projection, etc. In some embodiments, the display 64 may include a coder/decoder, also known as Codecs, to convert digital media data into analog signals. For example, the visual peripheral output device may include video Codecs, audio Codecs, or any other suitable type of Codec.

In some embodiments, the computing device 50 is configured to implement one or more modules or engines, each of which is constructed, programmed, configured, or otherwise adapted, to autonomously carry out a function or set of functions. A module/engine may include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/ engine may also be implemented as a combination of the two, with certain functions facilitated by hardware alone, and other functions facilitated by a combination of hardware and software. In certain implementations, at least a portion, and in some cases, all, of a module/engine may be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine may be realized in a variety of physically realizable configurations, and should generally not be limited to any particular implementation exemplified herein, unless such limitations are expressly called out. In addition, a module/engine may itself be composed of more than one sub-modules or sub-engines, each of which may be regarded as a module/engine in its own right. Moreover, in the embodiments described herein, each of the various modules/engines corresponds to a defined autonomous functionality; however, it should be understood that in other contemplated embodiments, each functionality may be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
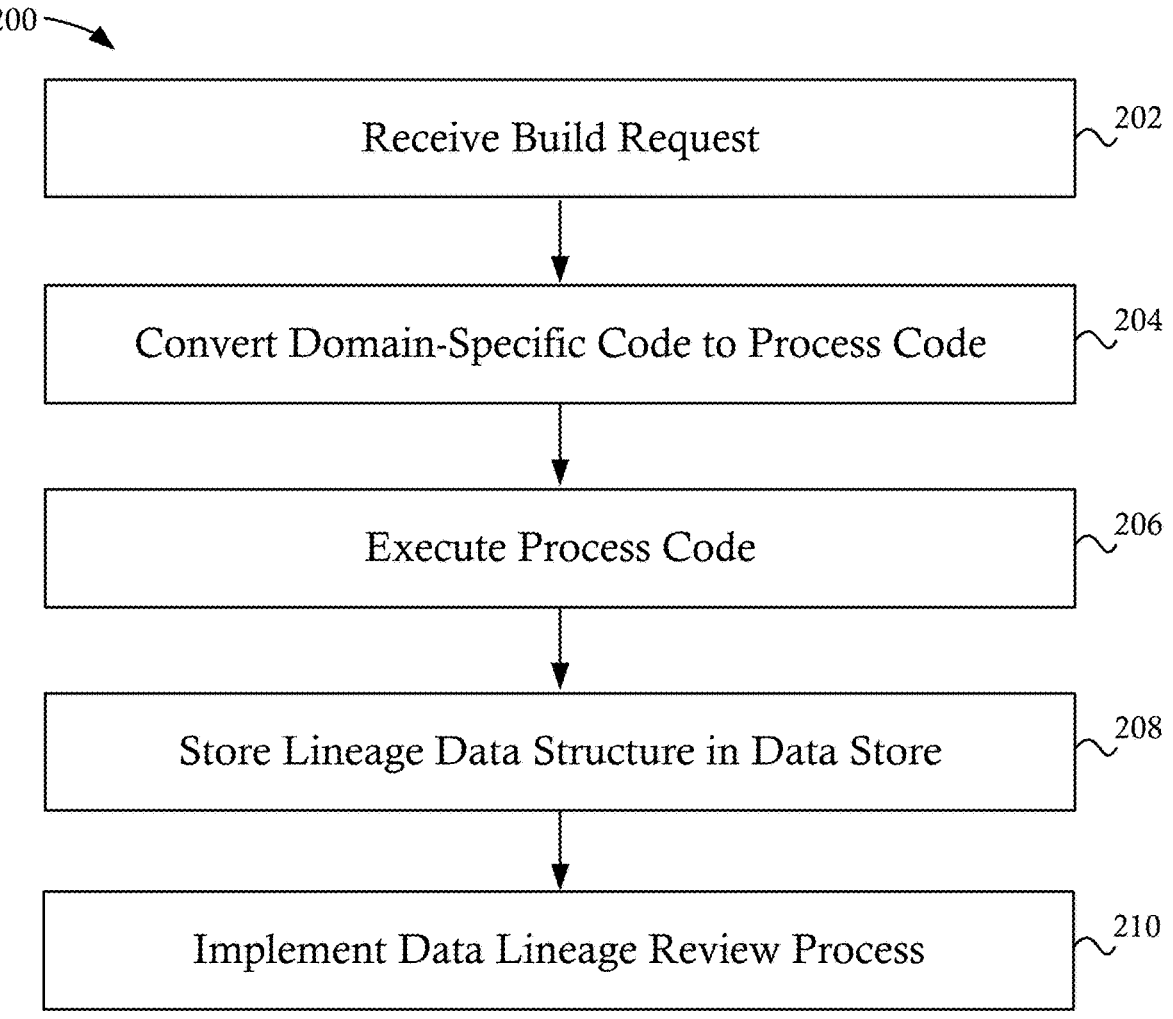
FIG. 3 is a flowchart illustrating a data lineage tracking method, in accordance with some embodiments.
Figure 4:
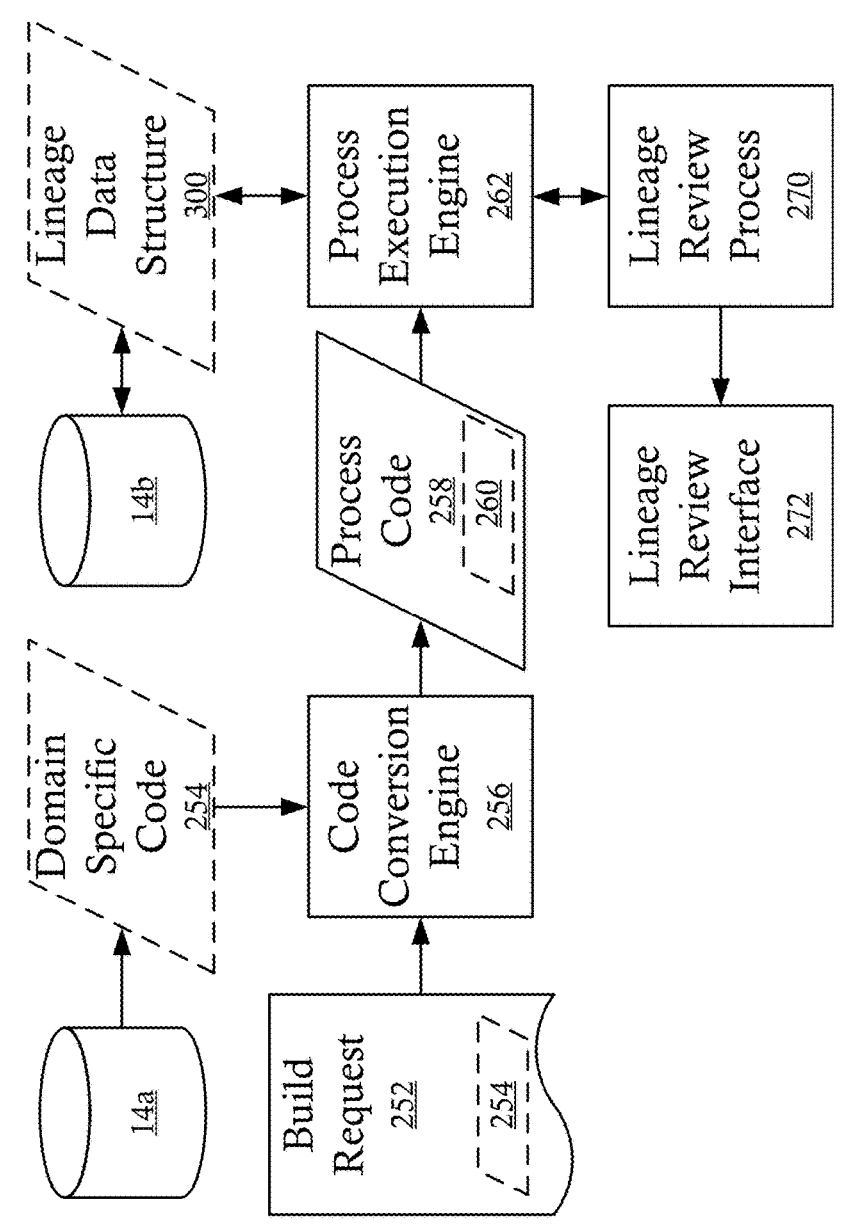
FIG. 4 is a block diagram illustrating various portions of a data lineage tracking system, in accordance with some embodiments.
Figure 4:

FIG. 3 is a flowchart illustrating a data lineage tracking method 200, in accordance with some embodiments. FIG. 4 is a process flow 250 illustrating various steps of the date lineage tracking method of FIG. 3, in accordance with some embodiments. At step 202, a build request 252 is received. The build request 252 may include a request to build system-executable code from predefined domain-specific code 254 and execute the executable code. The build request 252 may include the domain-specific code 254 and/or may cause the domain-specific code 254 to be retrieved from a data store, such as a data store 14*a*.

In some embodiments, domain-specific code 254 includes computer programming code defined (e.g. written) in a programming language directed to a specific domain. Domain-specific code may have a higher level of abstraction as compared to general programming languages and/or may be optimized for a specific class of problems included in or defined by the specific domain. Domain-specific languages may include terms, rules, or concepts related to and/or obtained from the specific domain or class of problems for which the domain-specific language is defined. In some embodiments, the domain-specific code 254 includes simplified processes and/or syntax that is targeted at and/or or configured for individuals who are familiar with and/or fluent in the domain for which the domain-specific language is defined.

The build request 252 may be received by any suitable engine, module, system, etc. For example, in some embodiments, the build request 252 is received by a code conversion engine 256. The code conversion engine 256 may be implemented by any suitable system, such as the process execution computing device 4 and/or any other suitable system. In some embodiments, the code conversion engine 256 may be integrated with one or more additional engines or modules, such as, for example, the processing engine 262 discussed in greater detail below.

At step 204, the domain-specific code 254 is converted to process code 258. In some embodiments, conversion of the domain-specific code 254 to process code 258 includes conversion (e.g., translation) of the domain-specific code 254 from a domain-specific language to a process execution programming language. For example, in some embodiments, the domain-specific code 254 is converted form a domain-specific language to a process execution programming language including a generalized programming language, such as Java, C, C++, Python, etc. As another example, in some embodiments, the domain-specific code 254 is converted from a domain-specific language to a processor-specific language, system-specific language, program-specific language, etc. The process execution programming language may be selected based on the processing engine 262, the domain-specific code 254, etc. and/or may be a preselected programming language.

In some embodiments, the code conversion engine 256 is configured to convert the domain-specific code 254 to one or more process execution programming languages, e.g., one or more generic programming languages, in one or more formats. For example, in some embodiments, the code conversion engine 256 is configured to convert the domain-specific code 254 into generalized source code, such as Java, and/or generalized object code, such as compiled code. The code conversion engine 256 may be configured to generate multiple versions and/or translations of the domain-specific code 254, for example, generating source code in a two or more generalized programming languages, object code compiled from any of the converted source code, etc.

The code conversion engine 256 is configured to insert breadcrumb instrumentation to facilitate collection of breadcrumb data elements during execution of the process code. The code conversion engine 256 may be configured to insert predetermined and/or preselected breadcrumb instrumentation elements 260 at selected locations within the process code 258 based on operations identified or delineated in the domain-specific code 254. In some embodiments, the code conversion engine 256 includes a rules-based augmentation process for inserting the breadcrumb instrumentation into the process code 258.

In some embodiments, the code conversion engine 256 is configured to insert predetermined and/or preselected breadcrumb instrumentation elements 260. Breadcrumb instrumentation elements 260 may include, but are not limited to, pre-generated code snippets, function calls, resource calls, etc. configured to implement and/or define predetermine functions or operations. The breadcrumb instrumentation elements 260 are configured to be inserted into process code 258 at locations that correspond to operations in the domain-specific code 254 that are selected for documentation and/or tracking. The corresponding operations may include activities, functions, etc. configured to receive a set of input data and/or generate a set of output data.

For example, in some embodiments, the code conversion engine 256 is configured to insert a first breadcrumb instrumentation element 260 at positions in the process code 258 corresponding to read operations in the domain-specific code 254. The first breadcrumb instrumentation element 260 may be configured to collect an entity (e.g., an input data set, an input data structure, etc.) that is obtained and/or utilized by an activity in the domain-specific code 254. Examples of read operations in the domain-specific code 254 include, but are not limited to, calls to functions including input parameters, reading data from data sources (e.g., local disk, data store, etc.), use of previously defined variables, etc. For example, if the domain-specific code 254 includes an activity call passing a first entity as a parameter, the first breadcrumb instrumentation element 260 is configured to collect the input entity and/or the underlying data elements of the input entity as a potential breadcrumb.

As another example, in some embodiments, the code conversion engine 256 is configured to insert a second breadcrumb instrumentation element 260 at positions in the process code 258 corresponding to write operations in the domain-specific code 254. The second breadcrumb instrumentation element 260 may be configured to create and/or store a breadcrumb data element including previously collected input entities and a corresponding output entity. Examples of write operations in the domain-specific code 254 include, but are not limited to, return statements or functions, completion of previously called functions, receiving output of a function, writing of data to data sources, etc. For example, if the domain-specific code 254 includes an activity that returns a second entity as an output, the second breadcrumb instrumentation element 260 is configured to collect the second entity and any previously collected first entities and generate a breadcrumb data structure.

In some embodiments, an operation that is not correlated to a breadcrumb instrumentation element 260 (e.g., an operation in the domain-specific code 254 is an operation other than a specifically identified operation such as a read, write, etc.) does not trigger or cause insertion of any breadcrumb related elements or logic. For example, in embodiments including first breadcrumb instrumentation correlated to read operations in the domain-specific code 254 and second breadcrumb instrumentation correlated to write operations in the domain-specific code 254, operations other than a read operation or a write operation may not implicate data lineage requirements and no breadcrumb instrumentation is inserted. As another example, a null breadcrumb instrumentation placeholder may be inserted to identify that the "other" operation was considered but does not correlate to any breadcrumb instrumentation.

In some embodiments, a breadcrumb instrumentation element 260 includes a scoping mechanism configured to limit or restrict collection and storage of unnecessary inputs for a given output. For example, a scope may be defined as a stack of inputs that are collected and/or correlated with an activity, function, etc. A scoping mechanism may include program code or other logic configured to mark a stack each time a new scope is entered or defined. For example, the current scope may include a first input entity that was previously recorded. If the scope of the process changes (e.g., a new process is invoked, a process exits without an output, etc.), the scoping mechanism may mark the stack to indicate a new scope. When a breadcrumb data structure is generated for the current scope, entities in the stack prior to the mark may be ignored and/or discarded.

In some embodiments, the scoping mechanism is configured to recognize certain terms and/or code snippets in the domain-specific code 254 that can be ignored with respect to breadcrumb generation, even when such terms and/or code snippets are presented in conjunction with an otherwise monitored operation. For example, in some embodiments, domain-specific code 254 may include read and/or write operations unrelated to the output of the domain-specific code 254. Such unrelated operations may include, but are not limited to, display-related operations, debugging related operations, training dataset generation operations, etc. When the code conversion engine 256 encounters a predetermined term and/or code snippet in the domain-specific code 254 that may be ignored, the code conversion engine 256 may skip breadcrumb instrumentation insertion and/or apply a first logic rule that indicates no breadcrumb instrumentation is required.

In some embodiments, breadcrumb instrumentation insertion may be based on a data type included in an input and/or output entity. For example, the code conversion engine 256 may be configured to ignore an input entity and/or an output entity including one or more predetermined data types, such as reference data elements (e.g., metadata). In some embodiments, the code conversion engine 256 may include one or more rules configured to determine when an identified operation (e.g., a read operation, a write operation, etc.) is related to and/or includes reference data and exclude that operation from breadcrumb instrumentation insertion.

At step 206, the process code 258 is executed. In some embodiments, the process code 258 is provided to a processing engine 262 configured to execute the process code 258. The processing engine 262 is configured to execute the process code 258 including the breadcrumb instrumentation elements 260 integrated therein. The processing engine 262 may be configured to execute integrated breadcrumb instrumentation elements 260 provided in the same generic programming language as the converted domain-specific code, one or more references inserted into the process code 258 that cause execution of predefined breadcrumb operations integrated into the processing engine 262, execute breadcrumb instrumentation elements 260 provided in a programming language other than the generic programming language of the converted domain-specific code 254, etc.

For example, in some embodiments, the breadcrumb instrumentation elements 260 include references and/or calls to predefined operations implemented in and/or defined by the processing engine 262. For example, in various embodiments, predefined operations for breadcrumb generation may include, but are not limited to, predefined breadcrumb read operations, predefined breadcrumb write operations, etc. In some embodiments, the breadcrumb instrumentation elements 260 provide computer instructions in the same programming language/object code and/or a different programming language/object code as the converted domain-specific code 254 and are executed in conjunction with the converted domain-specific code 254 by the processing engine 262.

Figure 5:
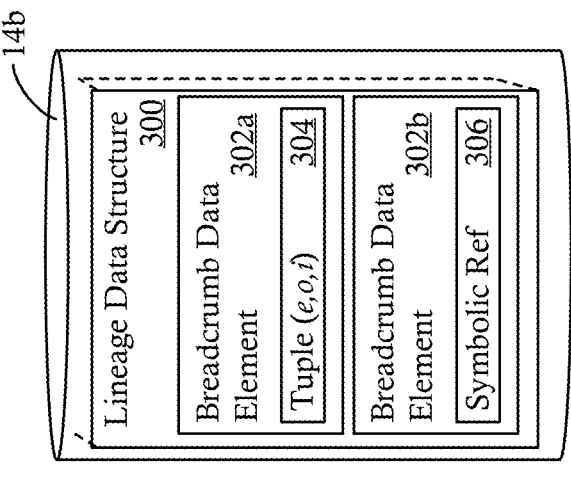
FIG. 5 is a process flow illustrating various steps of the date lineage tracking method of FIG. 3, in accordance with some embodiments.

In some embodiments, the processing engine 262 is configured to generate one or more lineage data structures 300 in response to execution of one or more breadcrumb instrumentation elements. For example, as illustrated in FIG. 5, a lineage data structure 300 may include one or more breadcrumb data elements 302a, 302b (collectively "breadcrumb data elements 302") configured to provide data lineage for an activity and/or scope executed by the processing engine 262 during execution of the process code 258, in accordance with some embodiments. A lineage data structure 300 may include multiple breadcrumb data elements 302 corresponding to multiple activities performed during execution of the process code 258 and/or may include breadcrumb data elements 302 corresponding to a single executed activity.

In some embodiments, a breadcrumb data element 302a includes a tuple 304 configured to store an input entity, an output entity, and an operation. In some embodiments, a tuple 304 may be defined as (e, o, i) where $e \in Exec$ with Exec being the set of executions that are selected for breadcrumb instrumentation insertion, $i \in I$ with I being the set of input entities that are collected, and $o \in O$ with O being the set of output entities that are collected. In some embodiments, I⊆Instances and O⊆Instances, wherein Instances is the set of entities observed within a scope. In some embodiments, each Instance includes a pair, e.g., (type, id) where type E Type with Type being the set of all data types of the executed process and id being a unique identifier of the instance. In some embodiments, a relation $B_e$:I→O defines a relation indexed by execution which for a given input i provides an output o defining a tuple 304 (e, o, i). Similarly, $$B_e^+: O \to I$$

defines a transitive closure of B stating that for a given execution e that takes an output o E O and returns a set of inputs $i_k \in 2^I$.

In some embodiments, a breadcrumb data element 302*b* includes a symbolic breadcrumb data element 306. A symbolic breadcrumb data element 306 includes an action (e.g., a query, function call, etc.) and associated input parameters. When a symbolic breadcrumb data element 306 is retrieved, the corresponding function call is re-executed with the associated input parameters to generate the output that would have been generated during execution of the process code 258. A symbolic breadcrumb data element 306 may be used to represent activities that generate large numbers of outputs or mappings. For example, a query that returns 1,000,000 elements and produces 800,000 outputs with a 0-1 relationship would create 800,000 explicit Instance mappings. In order to reduce processor load, retrieval time, data storage requirements, and other system requirements, a symbolic breadcrumb data element 306 representative of the query and the input set can be stored and the query can be re-executed when the symbolic breadcrumb is examined (as discussed in greater detail below). Although examples are provided herein, it will be appreciated that a symbolic breadcrumb data element 306 may be used to represent any suitable function execution.

Figure 6:
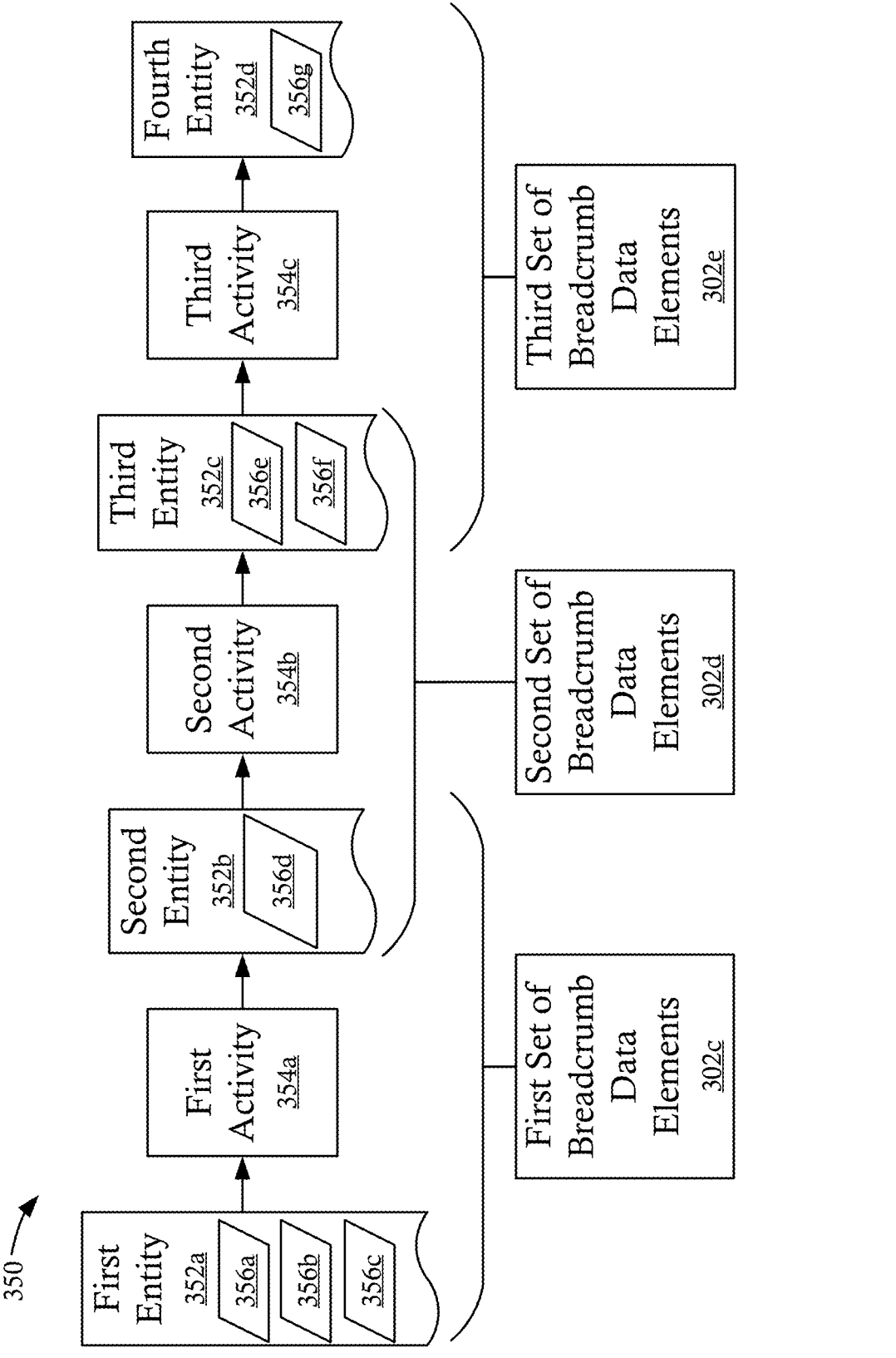
FIG. 6 illustrates a process flow including three activities and corresponding breadcrumb generation, in accordance with some embodiments.

FIG. 6 illustrates a process flow 350 including three activities 354*a*-354*c* and corresponding breadcrumb generation, in accordance with some embodiments. At an initial step, a first entity 352*a* is obtained (e.g., received, retrieved, generated, etc.). The first entity 352*a* includes three data elements 356*a*-356*c*. The first entity 352*a* is provided as an input to a first activity 354*a*. A second entity 352*b* including a fourth data element 356*d* is generated as an output of the first activity 354*a*. In addition to executing the first activity 354*a*, a processing engine 262 is configured to generate one or more breadcrumb data elements 302*c* representative of a data lineage for the first activity 354*a*. For example, in some embodiments, the processing engine 262 generates three tuple breadcrumb data elements: a first breadcrumb data element representative of the first data element 356*a*, an identifier representative of the first activity 354*a*, and the fourth data element 356*d*; a second breadcrumb data element representative of the second data element 356*b*, an identifier representative the first activity 354*a*, and the fourth data element 356*d*; and a third breadcrumb data element representative of the third data element 356*c*, an identifier representative the first activity 354*a*, and the fourth data element 356*d*. As another example, in some embodiments, the processing engine 262 generates a tuple breadcrumb data element including a set of input elements, e.g. [first data element 356*a*, second data element 356*b*, third data element 356*c*], an identifier representative the first activity 354*a*, and the fourth data element 356*d*. As yet another example, in some embodiments, the processing engine 262 generates a symbolic breadcrumb data element including the set of input elements, e.g. [first data element 356*a*, second data element 356*b*, third data element 356*c*], and an identifier representative the first activity 354*a*. The one or more breadcrumb data elements 302*c* representative of the data lineage for the first activity 354*a* may be stored in a data store, such as a data store 14*b* optimized for lineage data structures 300.

Returning to execution of the process code (e.g., the activities 354*a*-354*c* illustrated in FIG. 6), the second entity 352*b* is provided as an input to a second activity 354*b*. A third entity 352*c* including a fifth data element 356*e* and a sixth data element 356*f* is generated as an output of the second activity 354*b*. In some embodiments, the processing engine 262 is configured to generate one or more breadcrumb data elements 302*d* representative of a data lineage for the second activity 354*b*. For example, in some embodiments, the processing engine 262 generates two tuple breadcrumb data elements: a fourth breadcrumb data element representative of the fourth data element 356*d*, an identifier representative the second activity 354*b*, and the fifth data element 356*e* and a fifth breadcrumb data element representative of the fourth data element 356*d*, an identifier representative the second activity 354*b*, and the sixth data element 356*f*. As another example, in some embodiments, the processing engine 262 generates a tuple breadcrumb data element including a set of input elements, e.g. [fourth data element 356*d*], an identifier representative the second activity 354*b*, and a set of output elements, e.g., [fifth data element 356*e*, sixth data element 356*f*]. As yet another example, in some embodiments, the processing engine 262 generates a symbolic breadcrumb data element including the set of input elements, e.g. [fourth data element 356*d*], and an identifier representative the second activity 354*b*. The one or more breadcrumb data elements 302*d* representative of the data lineage for the second activity 354*b* may be stored in a data store, such as a data store 14*b* optimized for lineage data structures 300.

Returning again to execution of the process code, the third entity 352*c* is provided as an input to a third activity 354*c*. A fourth entity 352*d* including a seventh data element 356*g* is generated as an output of the third activity 354*c*. In some embodiments, the processing engine 262 is configured to generate one or more breadcrumb data elements 302*e* representative of a data lineage for the third activity 354*c*. For example, in some embodiments, the processing engine 262 generates two tuple breadcrumb data elements: a sixth breadcrumb data element representative of the fifth data element 356*e*, an identifier representative the third activity 354*c*, and the seventh data element 356*g*; and a seventh breadcrumb data element representative of the sixth data element 356*f*, an identifier representative the third activity 354*c*, and the seventh data element 356*g*. As another example, in some embodiments, the processing engine 262 generates a breadcrumb data element including a set of input elements, e.g. [fifth data element 356*e*, sixth data element 356*f*], an identifier representative the third activity 354*c*, and a set of output elements, e.g., the seventh data element 356*g*. As yet another example, in some embodiments, the processing engine 262 generates a symbolic breadcrumb data element including the set of input elements, e.g. [fifth data element 356*e*, sixth data element 356*f*], and an identifier representative of the third activity 354*c*. The one or more breadcrumb data elements 302*e* representative of the data lineage for the third activity 354*c* may be stored in a data store, such as a data store 14*b* optimized for lineage data structures 300.

With reference again to FIGS. 3-4, at step 208, the lineage data structure 300 is stored in a data store 14*b*. The data store 14*b* is configured to provide quick insertion of lineage data structures 300 and/or breadcrumb data elements 302 during execution of process code 258. The data store 14*b* is further configured to provide efficient querying of stored lineage data structures 300 and/or breadcrumb data elements 302 during lineage reconstruction, as discussed in further detail below. In some embodiments, the data store 14*b* comprises a non-relational data store structure, such as, for example, a NoSQL structure.

At step 210, a lineage review process 270 is implemented. The lineage review process 270 is configured to provide navigation through one or more lineage data structures 300 and/or breadcrumb data elements 302 associated with execution of process code 258. In some embodiments, a lineage review interface 272 is generated. The lineage review interface 272 is configured to receive inputs from a user and display interface elements representative of breadcrumb data elements 302 related to one or more activities performed during execution of process code 258. The lineage review interface 272 may be configured to display a selected portion and/or subset of one or more lineage data structures, for example, limiting a lineage review process 270 to a selected navigational depth, as discussed above.

In some embodiments, the lineage review process 270 is in communication with and/or integrated with the processing engine 262. The processing engine 262 may be configured to retrieve, format, and/or otherwise process lineage data structures 300 and/or breadcrumb data elements 302. In some embodiments, the processing engine 262 includes predefined processes for retrieving, formatting, and/or otherwise processing the breadcrumb data elements 302. For example, the processing engine 262 may be configured to execute activities for symbolic breadcrumb data elements 306. As another example, in some embodiments, the processing engine 262 may execute activities to retrieve a tuple 304 and interpret the tuple 304 for inclusion in an interface element of the lineage review interface 272.

In some embodiments, the processing engine 262 (or any other suitable process) is configured to receive an output and implement the transitive closure $$B_e^+$$

to generate or identify the set of inputs that were used to generate the output. The transitive closure $$B_e^+$$

may be provided for each activity performed during execution of the process code 258 and/or may be limited to a given navigational depth, e.g., a given number of steps from the output. For example, in some embodiments, the transitive closure may be implemented for a predetermined navigation depth, such as a depth of 2

$$(\text{e.g., } B_e^2).$$

In some embodiments, the lineage review process 270 is configured to provide visualization of one or more selected breadcrumb data elements 302. For example, the lineage review interface 272 may include interface elements configured to visualize each of the breadcrumb data elements 302 included in a lineage data structure 300. As another example, in some embodiments, the lineage review interface 272 may be configured to display a set of breadcrumb data elements 302 corresponding to a selected navigational depth. It will be appreciated that any suitable set of visual elements may be utilized to visually render the breadcrumb data elements 302.

To continue the example of FIG. 6, in some embodiments, a lineage review process 270 may be configured to query a data store 14*b* to retrieve breadcrumb data elements 302*c*-302*e* related to one or more activities 354*a*-354*c* performed during execution of the corresponding process code. The processing engine 262 may be configured to retrieve breadcrumb data elements 302*c*-302*e* from the data store 14*b* and apply the transitive closure Be to process the represented mappings between input data elements and output data elements. The processing engine 262 may be configured to provide the processed mappings to the lineage review process 270, which generates a lineage review interface including interface elements configured to illustrate the represented mappings. In some embodiments, a limited navigational depth may be selected limiting the lineage review interface to a subset of the available breadcrumb data structures 302*c*-302*e*.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a non-transitory memory;
a processor communicatively coupled to the non-transitory memory, wherein the processor is configured to read a set of instructions to:
obtain domain-specific code in response to a build request, wherein the domain-specific code includes an instance of a domain-specific language configured for a specific domain;
generate process code, including (i) converting the domain-specific code to a format of the process code and (ii) automatically inserting at least one breadcrumb instrumentation element, wherein the at least one breadcrumb instrumentation element is automatically inserted during conversion by a conversion engine, and
wherein the breadcrumb instrumentation element is not defined in the domain-specific code;
execute the process code, wherein execution of the process code includes;
execution of one or more activities defined by the domain-specific code; and
generation of a lineage data structure, via execution of the at least one breadcrumb instrumentation element, that stores data elements representative of a mapping between an input data element and an output data element;
store the lineage data structure in a data store; and
implement a data lineage review process,
wherein the at least one breadcrumb instrumentation element is inserted in the process code at a location corresponding to a function type defined in the domain-specific code.

2. The system of claim 1, wherein the lineage data structure comprises a tuple defining a set of inputs, a set of outputs, and a corresponding activity of the one or more activities defined by the domain-specific code.

3. The system of claim 2, wherein the set of inputs and the set of outputs each comprise at least one instance comprising a type and an identifier.

4. The system of claim 1, wherein the lineage data structure comprise a symbolic data element defining a set of inputs and a corresponding activity of the one or more activities defined by the domain-specific code.

5. The system of claim 1, wherein the at least one breadcrumb instrumentation element comprises a function call to a function defined by a processing engine configured to execute the process code.

6. The system of claim 1, wherein the breadcrumb instrumentation element comprises a scoping mechanism.

7. The system of claim 6, wherein the scoping mechanism is configured to mark a stack of potential inputs, and wherein the lineage data structure comprises inputs occurring after the mark in the stack.

8. The system of claim 1, wherein the process code comprises Java™ code.

9. A computer-implemented method, comprising:

obtaining domain-specific code in response to a build request, wherein the domain-specific code includes an instance of a domain-specific language configured for a specific domain;

generating process code, including (i) converting the domain-specific code to a format of the process code and (ii automatically inserting at least one breadcrumb instrumentation element, wherein the at least one breadcrumb instrumentation element is automatically inserted during conversion by a conversion engine, and wherein the breadcrumb instrumentation element is not defined in the domain-specific code;

executing the process code, wherein execution of the process code includes:

execution of one or more activities defined by the domain-specific code; and generation of a lineage data structure, via execution of the at least one breadcrumb instrumentation element, that stores data elements representative of a mapping between an input data element and an output data element;

storing the lineage data structure in a data store; and implementing a data lineage review process, wherein the at least one breadcrumb instrumentation element is inserted in the process code at a location corresponding to a function type defined in the domain-specific code.

10. The computer-implemented method of claim 9, wherein the lineage data structure comprises a tuple defining a set of inputs, a set of outputs, and a corresponding activity of the one or more activities defined by the domain-specific code.

11. The computer-implemented method of claim 9, wherein the lineage data structure comprise a symbolic data element defining a set of inputs and a corresponding activity of the one or more activities defined by the domain-specific code.

12. The computer-implemented method of claim 9, wherein the at least one breadcrumb instrumentation element comprises a function call to a function defined by a processing engine configured to execute the process code.

13. The computer-implemented method of claim 9, wherein the breadcrumb instrumentation element comprises a scoping mechanism.

14. The computer-implemented method of claim 13, wherein the scoping mechanism is configured to mark a stack of potential inputs, and wherein the lineage data structure comprises inputs occurring after the mark in the stack.

15. A non-transitory computer readable medium having instructions stored thereon, wherein the instructions, when executed by at least one processor, cause at least one device to perform operations comprising:

obtaining domain-specific code in response to a build request, wherein the domain-specific code includes an instance of a domain-specific language configured for a specific domain;

generating process code, including (i) converting the domain-specific code to a format of the process code and (ii) automatically inserting at least one breadcrumb instrumentation element, wherein the at least one breadcrumb instrumentation element is automatically inserted during conversion by a conversion engine, and wherein the breadcrumb instrumentation element is not defined in the domain-specific code;

executing the process code, wherein execution of the process code includes:

execution of one or more activities defined by the domain-specific code; and generation of a lineage data structure, via execution of the at least one breadcrumb instrumentation element, that stores data elements representative of a mapping between an input data element and an output data element;

storing the lineage data structure in a data store; and implementing a data lineage review process, wherein the lineage data structure comprises a tuple defining a set of inputs, a set of outputs, and a corresponding activity of the one or more activities defined by the domain-specific code.

16. The non-transitory computer readable medium of claim 15, wherein the lineage data structure comprise a symbolic data element defining a set of inputs and a corresponding activity of the one or more activities defined by the domain-specific code.

17. The non-transitory computer readable medium of claim 15, wherein the at least one breadcrumb instrumentation element comprises a function call to a function defined by a processing engine configured to execute the process code.

\* \* \* \* \*